April 20, 1948.  E. P. PALMATIER  2,440,115
DEICING SYSTEM FOR AIRCRAFT SURFACES
Filed Jan. 11, 1944  2 Sheets-Sheet 2
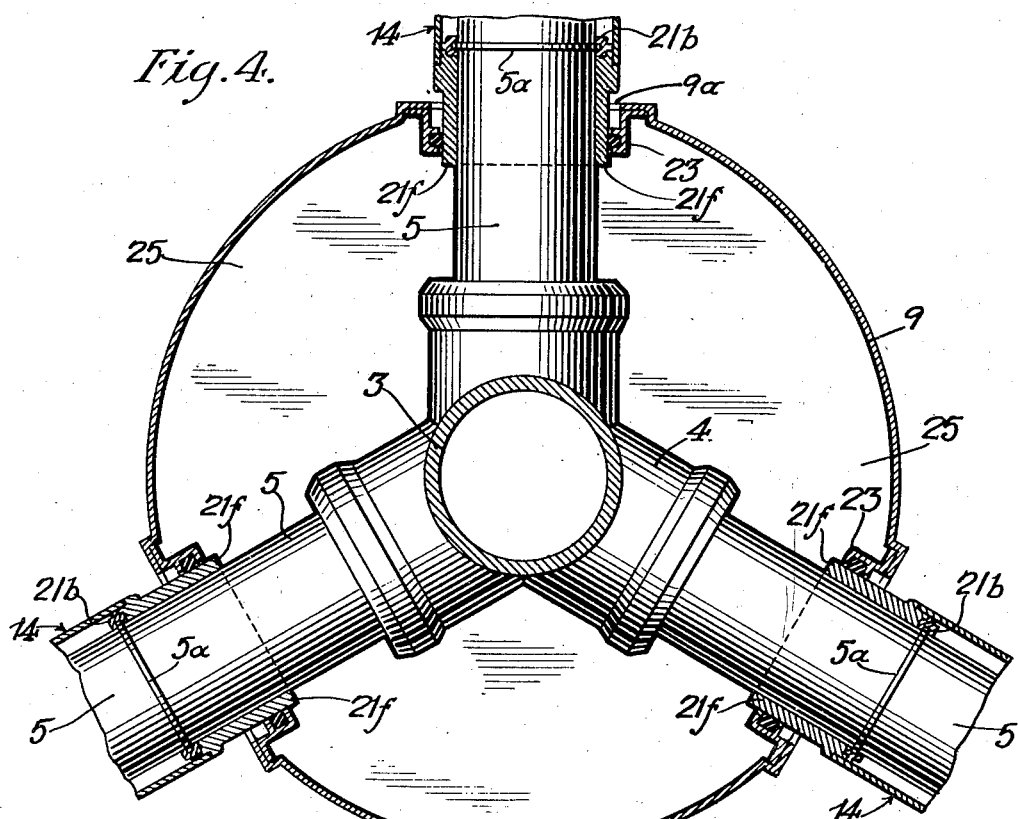
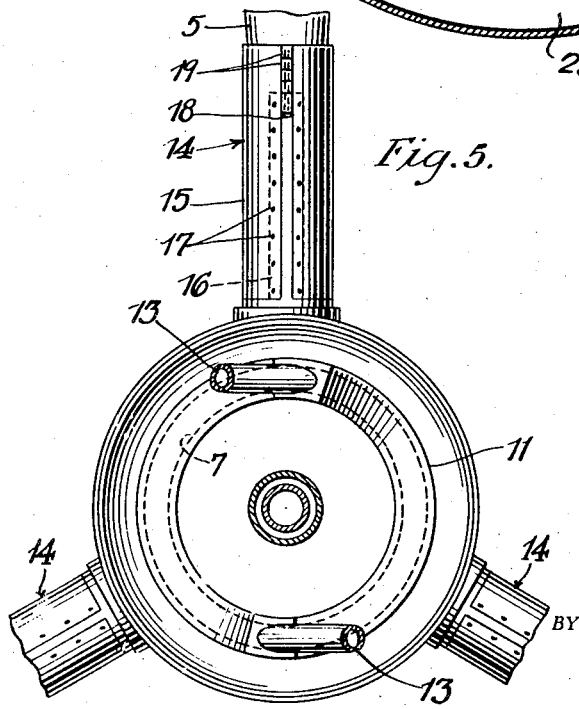
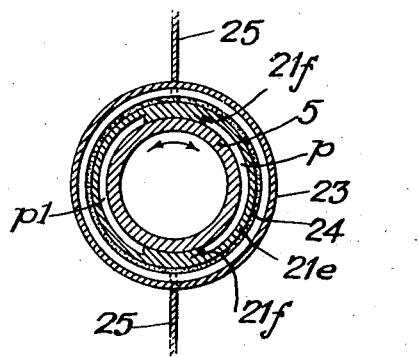
INVENTOR
Everett P. Palmatier
BY
ATTORNEY Patented Apr. 20, 1948

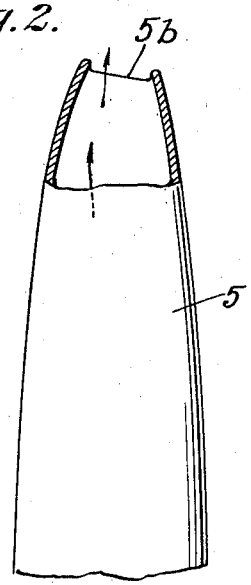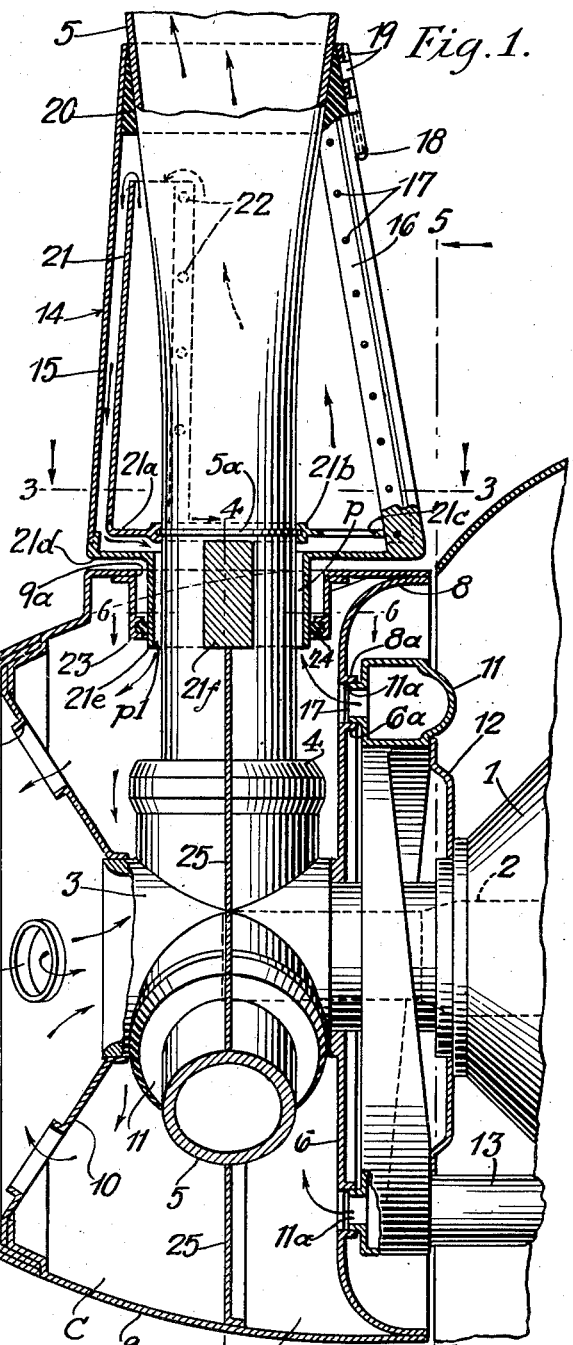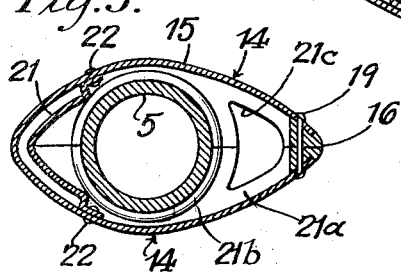

2,440,115

UNITED STATES PATENT OFFICE 2,440,115

DEICING SYSTEM FOR AIRCRAFT SURFACES

Everett P. Palmatier, Upper Montclair, N. J., assignor to Curtiss-Wright Corporation, a corporation of Delaware Application January 11, 1944, Serial No. 517,873

5 Claims. (Cl. 244—134)

My invention relates to a system for de-icing rotatable aircraft surfaces.

In accordance with my invention, the spinner, the propeller blades and/or the cuffs associated with the respective propeller blades are subjected, for de-icing purposes, to the action of hot gases or a hot gaseous medium.

It is a feature of my invention that a hot gaseous medium, as aforesaid, is passed into the chamber defined by the aircraft spinner and, thereafter, said hot gaseous medium is passed into engagement with the propeller blades and/or cuffs.

It is a further feature of my invention that the propeller blades and/or blade cuffs are subjected, in a novel manner, to the action of a hot gaseous medium for de-icing purposes.

Various other objects and advantages of my invention will become apparent from the following detailed description.

My invention resides in the art, system and arrangements for de-icing rotatable aircraft surfaces as hereinafter described and claimed.

For an understanding of my invention and for an illustration of one of the many forms thereof, reference is to be had to the accompanying drawings, in which:

Figure 1 is a vertical sectional view, partly in elevation, showing a de-icing system as constructed in accordance with my invention;

Fig. 2 is a fragmentary view, partly in section, showing the end of a propeller blade;

Fig. 3 is a transverse, horizontal sectional view taken on the line 3—3 of Fig. 1 looking in the direction of the arrows;

Fig. 4 is a transverse, vertical sectional view, partly in elevation, taken on the line 4—4 of Fig. 1 looking in the direction of the arrows;

Fig. 5 is a transverse, vertical sectional view, partly in elevation, taken on the line 5—5 of Fig. 1 looking in the direction of the arrows; and Fig. 6 is a transverse, horizontal sectional view taken on the line 6—6 of Fig. 1 looking in the direction of the arrows.

Referring to Fig. 1, I have shown the nose 1 of an aircraft engine having the propeller shaft 2 extending therefrom. Secured in known manner to the shaft 2 is the propeller hub 3 which comprises a plurality of radially extending sockets 4 for the respective propeller blades 5. Ordinarily, but not necessarily, suitable mechanism, not shown, is provided for changing the pitch of the propeller blades 5.

In accordance with the invention, the propeller blades 5 are of the hollow passage-forming type, the same being true of the hub 3 and the sockets 4 in the sense that an open passage extends from the front end of the hub 3 and then through each socket 4, these passages communicating with the respective passages defined by said propeller blades 5.

Bolted or otherwise suitably secured to a rear section of the hub 3 is a disk 6 terminating in a circular flange 6a concentrically disposed with respect to the propeller shaft 2. Spaced from the flange 6a to thereby form a circular slot 7 is the circular flange 8a of a curved member 8, the flange 8a being concentrically disposed with respect to the flange 6a and said member 8 being secured in suitable manner to the rear section of the spinner 9 which is attached in known manner, as partly by the transverse structure 10, to the hub 3 so as to be rotatable therewith as a unit. As will be understood, the flanges 6a and 8a should be secured to each other in suitable manner, as by spaced connecting webs, not shown.

Disposed in the aforesaid slot 7 is the circular passage-forming extension 11a of a circular housing 11 secured in fixed position in any suitable manner, as by a disk 12 attached thereto and to the engine nose 1. The flanges 6a, 8a are disposed closely adjacent the respective walls of the extension 11a and, preferably, packings, labyrinths or other suitable sealing means, not shown, are disposed between adjacent surfaces defined by said flanges and walls. Communicating with the housing 11 is or are one or more pipes 13 through which a heated gaseous medium is supplied in suitable manner to said housing 11 as hereinafter described.

As herein shown, each of the propeller blades 5 has associated therewith a cuff 14 which is formed from a metallic shell 15, Fig. 3, shaped into cuff formation. At the trailing edge of the cuff, the two edges of the shell 15 are attached together by a coupling member 16, said shell edges and the member 16 being secured together by rivets 17. The coupling member 16 terminates short of the outer end of the cuff and, in this area, the trailing shell edges are secured together by a pin 18 which extends through cylindrical members 19 alternately formed on said cuff edges, respectively. The outer end of each cuff 14 has associated therewith a sealing member 20 formed preferably of rubber, this sealing member 20 engaging the adjacent propeller blade surface and anchoring the upper end of the cuff 14 in operative position.

Each cuff 14 further comprises a member 21 disposed interiorly of the shell 15 at the leading cuff edge and spaced therefrom in generally parallel relation, the shell 15 being secured to the member 21 by rivets 22, or equivalent.

As regards each cuff 14, the member 21 thereof is seated on a plate 21a which may be formed integrally with the aforesaid coupling member 16. The plate 21a is formed with an opening which is defined by a circular section 21b having U-configuration. The associated propeller blade 5 extends through this opening and the U-section 21b cooperates with a flange 5a formed exteriorly on said propeller blade 5 to thereby support the associated cuff 14 in operative position. As shown particularly in Fig. 3, the plate 21a comprises an opening 21c utilizable as hereinafter described.

Formed as an integral part of the structure consisting of the coupling member 16 and the plate 21a is a plate 21d upon which the aforesaid shell 15 is seated. This plate 21d comprises a tubular section 21e which extends inwardly in spaced relation with respect to the exterior surface of the associated propeller blade 5, each tubular section 21e extending through an opening 9a formed in the spinner 9. As will appear from a consideration of Fig. 6, each tubular section 21e should comprise oppositely disposed, inwardly extending sections 21f, each of which comprises an arcuate face disposed flushly against the adjacent surface of the propeller blade 5.

Concentrically disposed with respect to the tubular section 21e of each plate 21d and secured in suitable manner to the adjacent surface of the spinner 9 is a tubular member 23 which, in suitable manner, carries a circular seal or packing 24 related, in sealing relation, with the adjacent surface of said tubular section 21e of the plate 21d.

I have hereinbefore stated that the coupling member 16, the plates 21a and 21d together with the tubular section 21e are an integral structure. This, in effect, is an accurate statement. However, in actual practice and as indicated in Fig. 3, it will be understood that the aforesaid structure will consist of separate parts which are assembled in operative relation and then suitably secured together.

In view of the foregoing description, it will be understood that each cuff 14 including the plate 21d and tubular section 21e thereof are secured to each propeller blade 5 for movement therewith as a unit. Accordingly, during a pitch-changing operation, the aforesaid tubular section 21e of each plate 21d moves rotatably with respect to its gasket 24 and the associated tubular member 23, said packing 24 maintaining a sealed joint at all times between these relatively movable parts.

In accordance with the invention, the space defined by the spinner 9 is divided into two chambers C and C1 by a partition formed, for example, from three members 25, in the case of a three blade propeller, which are disposed in the same plane and suitably secured to the interior surface of said spinner 9 throughout the entire circular length thereof between the respective sets of tubular members 23. As indicated in Fig. 4, the members 25 have such configuration, throughout the lengths thereof removed from the spinner surface, that each of them closely engages a pair of the spinner tubular members 23, the ends of a pair of the arcuate sections 21f, the exposed surfaces of a pair of propeller blades 5 and the alined surfaces of a pair of the sockets 4. The members 25, then, except in the manner described immediately below, effectively separate the chambers C and C1 from each other and in conjunction with the respective arcuate sections 21f, divide the passage between each blade 5 and the associated tubular section 21e into separate paths p and p1, Fig. 6. During the usual pitch-changing operations occurring during ordinary flight conditions, the respective arcuate sections 21f remain in engagement with the members 25 with the result that, during such pitch-changing operations, the paths p and p1 afford the sole means of communication between the chambers C and C1.

During flight of the aircraft and when it becomes necessary to subject the propeller blades 5, the spinner 9 and the cuffs 14 to a de-icing operation, streams of heated air or other hot gaseous medium are passed, by way of the respective pipes 13, into the fixed housing 11. From said housing 11, the hot gaseous medium passes, by way of the housing extension 11a, into the chamber C1. From the chamber C1, the hot gaseous medium passes outwardly into each of the cuffs 14 by way of the path p. In each cuff, the hot gaseous medium flows through the opening 21c of the plate 21a and then passes outwardly toward the sealing member 20, then inwardly through the passage formed between the shell 15 and the member 21 and thereafter into the chamber C by way of the path p1. In the chamber C, the hot gaseous medium flows into the front area of the spinner 9 by way of the openings 10a formed in the transverse structure 10. From such front area of the spinner 9, the hot gaseous medium passes through the hollow propeller hub 3 and then flows by way of the respective sockets 4 into the hollow propeller blades 5, the streams of the hot gaseous medium passing through said propeller blades and finally passing to the atmosphere by way of openings 5b formed at or adjacent the ends of the respective propeller blades 5.

As will be understood, the hot gases are drawn into and through the propeller blades 5 by centrifugal action in response to rotation thereof and, to some extent, this same action occurs with respect to the cuffs 14. This centrifugal action or negative pressure effect will usually be present in the system as far back as the housing 11 and probably in the pipes 13. However, as disclosed in my application filed of even date herewith Serial No. 517,874 filed January 11, 1944, a source of positive pressure should be effective for causing the hot gases to move through the pipes 13 toward the housing 11.

As a result, the cuffs 14, the spinner 9 and the propeller blades 5, for de-icing purposes, are simultaneously subjected to the action of a hot gaseous medium. In the cuffs 14, by reason of the presence of the respective members 21, the heating action is highly effective at the leading edges thereof, these edges being particularly susceptible to icing conditions. As regards the spinner 9, it will be understood that the hot gaseous medium passing into the front area thereof by way of the passages 10a effectively heats the front spinner surface for de-icing purposes while, at the same time, said hot gaseous medium passes into the propeller hub 3 and, thence, into and through the propeller blades 5 for the purpose described.

It will be understood that the space defined by the spinner 9 is sealed, entirely or substantially so, from the atmosphere at all times with the exception of the propeller blade vents 5a.

The packings 24 seal the joints between the respective sets of tubular sections 21e and tubular members 23. However, during a pitch-changing operation, each tubular section 21e moves rotatably with respect to its associated packing 24 while maintaining the sealing relation.

In a preferred form of my invention, the hot gaseous medium which is passed into the spinner 9 is heated air which is obtained in the manner described in my pending application Serial No. 503,143, filed September 20, 1943. It shall be understood, however, that my invention is not to be thus limited. Thus, for example, the heated air may be obtained in any other suitable manner and, moreover, the invention is not to be limited to the use of heated air since other heated mediums such, for example, as the hot exhaust gases of the aircraft engine may be used for de-icing purposes in accordance with a broad application of my invention.

In the appended claims, the expression "de-icing" shall be understood as describing true de-icing wherein that ice is melted which, previously, had been formed on the described rotating aircraft surfaces, i. e., the propeller blades 5, the spinner 9 or the cuffs 14 and said expression shall also be understood as describing an operation wherein said aircraft surfaces are subjected to the action of a hot gaseous medium in order to positively prevent the formation of ice thereon.

Although I have shown a de-icing system for a rotatable system comprising a spinner, propeller blades and associated cuffs, it shall be understood, except as limited by the appended claims, that my invention is not to be limited to the use of cuffs with the respective propeller blades.

While the invention has been described with respect to a certain preferred particular example which gives satisfactory results, it will be understood by those skilled in the art after understanding the invention, that various changes and modifications may be made without departing from the spirit and scope of the invention and it is intended, therefore, in the appended claims to cover all such changes and modifications.

What is claimed as new and desired to be secured by Letters Patent, is:

1. In combination, an aircraft spinner, a propeller hub, a plurality of propeller blades projecting from said hub, a hollow cuff associated with each blade, a partition extending transversely in said spinner and engaging said blades and hub to form rear and forward chambers, means for passing a hot gaseous medium into one of the spinner chambers, conduits between and opening into the cuffs and said one chamber to conduct the hot gaseous medium from said one chamber into the interior space of said cuff, conduits between and opening into the cuffs and said other chamber to conduct said medium from the cuffs into the other chamber in said spinner, and means to conduct said medium from the other spinner chamber to the atmosphere.

2. In combination, an aircraft spinner, a propeller hub, a plurality of hollow propeller blades projecting from said hub, a hollow cuff associated with each blade, a partition extending transversely in said spinner and engaging said blades and hub to form rear and forward chambers, a conduit from one said spinner chamber to the interior space defined by a cuff, a conduit from said cuff to the other of said chambers, and a conduit from said other chamber to the hollows of said propeller blades.

3. In combination, an aircraft spinner, a propeller hub, a plurality of hollow propeller blades projecting from said hub, a hollow cuff associated with each blade, a partition extending transversely in said spinner and engaging said blades and hub to form rear and forward chambers, a conduit from said hollow propeller blades communicating with the forward spinner chamber, conduits forming passages from both said spinner chambers to the cuff hollows, a partition in said cuff to divide the cuff into separate passages each open to one said conduit, and means for passing a hot gaseous medium into the rear spinner chamber, said hot gaseous medium thence passing from the rear spinner chamber to the cuff by way of one of said conduits, thence passing out of the cuff through another of said conduits to enter the forward spinner chamber, said hot gaseous medium then passing from the forward spinner chamber and entering the hollow propeller blades.

4. In a propeller assembly comprising a hub, a hollow blade component mounted therein, a hollow cuff component on said blade and a hollow spinner component inclosing said hub, conduits interconnecting the spinner, cuff and blade hollows, a source of heated gas including means to conduct gas to one of said components for passage therefrom, serially, through the other components, and means to connect the last component of the series to the atmosphere for issue of spent gas thereto.

5. In a propeller assembly comprising a hub, a hollow blade component mounted therein, a hollow cuff component on said blade and a hollow spinner component inclosing said hub, conduits interconnecting the spinner, cuff and blade hollows, a source of heated gas including means to conduct gas to one of said components for passage therefrom, serially, through the other components, and means to connect the last component of the series to the atmosphere for issue of spent gas thereto, said last component comprising the propeller blade.

EVERETT P. PALMATIER.

REFERENCES CITED

The following references are of record in the file of this patent:

UNITED STATES PATENTS

| Number | Name | Date |
|---|---|---|
| 1,879,717 | Sikorsky | Sept. 27, 1932 |
| 1,899,689 | Houston | Feb. 28, 1933 |
| 2,289,400 | Woods | July 12, 1942 |
| 2,318,233 | Keller | May 4, 1943 |

FOREIGN PATENTS

| Number | Country | Date |
|---|---|---|
| 525,452 | Great Britain | Aug. 28, 1940 |
| 837,466 | France | Nov. 12, 1938 |